(12) United States Patent
Liao et al.

(10) Patent No.: US 11,623,434 B2
(45) Date of Patent: Apr. 11, 2023

(54) BIAXIALLY STRETCHED POLYESTER FILM AND METHOD FOR PRODUCING THE SAME

(71) Applicant: NAN YA PLASTICS CORPORATION, Taipei (TW)

(72) Inventors: Te-Chao Liao, Taipei (TW);
Wen-Cheng Yang, Taipei (TW);
Hao-Sheng Chen, Taipei (TW);
Chia-Yen Hsiao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 302 days.

(21) Appl. No.: 17/012,239

(22) Filed: Sep. 4, 2020

(65) Prior Publication Data
US 2021/0086489 A1    Mar. 25, 2021

(30) Foreign Application Priority Data
Sep. 25, 2019  (TW) .................................. 108134670

(51) Int. Cl.
*B32B 27/20* (2006.01)
*C08K 3/013* (2018.01)
(Continued)

(52) U.S. Cl.
CPC .......... *B32B 27/20* (2013.01); *B29C 48/0018* (2019.02); *B29C 48/08* (2019.02);
(Continued)

(58) Field of Classification Search
CPC ........ B32B 27/08; B32B 27/36; B32B 27/20; B32B 2307/408; B32B 2264/0278;
(Continued)

(56) References Cited

U.S. PATENT DOCUMENTS 3,154,461 A    10/1964  Johnson
6,358,604 B1 *  3/2002  Peiffer ................... B32B 27/36
                                              428/458
(Continued)

FOREIGN PATENT DOCUMENTS

DE    2353347 A1    5/1974
EP    0053498 B1    3/1985
(Continued)

OTHER PUBLICATIONS

Devi, Temperature Dependence of Unperturbed Dimension and Interaction Parameters of Polyester Resin in Solvents, 1994, Polymer International, vol. 34, pp. 257-265. (Year: 1994).*

(Continued)

*Primary Examiner* — Monique R Jackson
(74) *Attorney, Agent, or Firm* — Li & Cai Intellectual Property (USA) Office

(57) ABSTRACT

A biaxially stretched polyester film and a method for producing the same are provided. The biaxially stretched polyester film includes a polyester resin base layer and a matte layer. The polyester resin base layer includes: (1) 50 to 95 wt % of a polyester resin base material, and an intrinsic viscosity of the polyester resin base material being between 0.5 and 0.8 dL/g; and (2) 0.01 to 5 wt % of a high viscosity polyester resin material, and an intrinsic viscosity of the high viscosity polyester resin material being between 0.9 and 1.1 dL/g. The matte layer includes: (1) 50 to 95 wt % of a polyester resin matrix material, and an intrinsic viscosity of the polyester resin matrix material being between 0.5 and 0.8 dL/g; and (2) 0.3 to 40 wt % of a plurality of filler particles, and the filler particles having an average particle size of between 0.15 μm and 10 μm.

3 Claims, 3 Drawing Sheets

(51) Int. Cl.
  *B32B 27/08* (2006.01)
  *B32B 27/36* (2006.01)
  *B29C 48/08* (2019.01)
  *B29C 48/21* (2019.01)
  *C08J 5/18* (2006.01)
  *B29K 67/00* (2006.01)
  *B29C 55/14* (2006.01)
  *B29C 48/00* (2019.01)
  *B29K 509/02* (2006.01)

(52) U.S. Cl.
  CPC ............ *B29C 48/21* (2019.02); *B29C 55/146* (2013.01); *B32B 27/08* (2013.01); *B32B 27/36* (2013.01); *C08J 5/18* (2013.01); *C08K 3/013* (2018.01); *B29K 2067/00* (2013.01); *B29K 2509/02* (2013.01); *B29K 2995/0024* (2013.01); *B32B 2250/02* (2013.01); *B32B 2250/244* (2013.01); *B32B 2264/102* (2013.01); *B32B 2264/12* (2013.01); *B32B 2307/408* (2013.01); *B32B 2307/412* (2013.01); *B32B 2307/518* (2013.01); *B32B 2307/538* (2013.01); *C08J 2367/00* (2013.01); *C08K 2201/005* (2013.01)

(58) Field of Classification Search
  CPC ...... B32B 2264/0285; B32B 2250/244; B32B 2250/02; B32B 2307/518; B32B 2307/412; B32B 2307/538
  See application file for complete search history.

(56) References Cited

U.S. PATENT DOCUMENTS

| | | | |
|---|---|---|---|
| 2002/0071945 A1* | 6/2002 | Peiffer | B32B 27/36 428/327 |
| 2004/0130059 A1* | 7/2004 | Kern | C08J 5/18 264/235.8 |
| 2009/0123756 A1* | 5/2009 | Hashimoto | B32B 21/08 428/480 |

FOREIGN PATENT DOCUMENTS

| | | |
|---|---|---|
| JP | 2002241516 A | 8/2002 |
| JP | 2016153228 A | 8/2016 |
| TW | 200512235 A | 4/2005 |

OTHER PUBLICATIONS

Mehrdad, Effect of Temperature and Solvent Composition on the Intrinsic Viscosity of Poly(ethylene glycol) in Water-Ethanol Solutions, 2010, J. Chem. Eng. Data., vol. 55, pp. 2537-2541. (Year: 2010).*

Machine translation of JP2016-153228A, published Aug. 2016, Powered by EPO and Google. (Year: 2016).*

* cited by examiner

BIAXIALLY STRETCHED POLYESTER FILM AND METHOD FOR PRODUCING THE SAME

CROSS-REFERENCE TO RELATED PATENT APPLICATION

This application claims the benefit of priority to Taiwan Patent Application No. 108134670, filed on Sep. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyester film, and more particularly to a biaxially stretched polyester film and a method for producing the same.

BACKGROUND OF THE DISCLOSURE

Compared to the general plastic films produced by the cast film process or the blown film process, the biaxially stretched polyester films (also called biaxially oriented polyester film, BOPET film) produced by the biaxial stretching process have better performance and wider application. Accordingly, the biaxial stretching process is the main method for producing the polyester film. However, in certain applications, the physicochemical properties of the conventional biaxially stretched polyester films still have many issues that should be addressed.

For example, U.S. Pat. No. 3,154,461A discloses a matte-finish polymeric film prepared from a thermoplastic such as polyethylene terephthalate or polypropylene. The film includes incompressible particles (i.e., calcium carbonate particles or silicon oxide particles) having a particle size of between 0.3 μm and 20 μm and a concentration of between 1 wt % and 25 wt %. However, the film has a degree of mattness that is unsatisfactory for many applications thereof.

German Patent No. DE2353347A1 discloses a method for producing a milky polyester film having one or more layer structures. The method includes preparing a mixture including linear polyester particles, and the mixture further includes 3 wt % to 27 wt % of homo-polymer or co-polymer of ethylene or propylene. The method further includes steps of extruding the mixture into a film; quenching the film; orienting the film along a direction perpendicular to the film, and then heat setting the film. The drawbacks of this method is that the scrap material (essentially a mixture of polyester and ethylene copolymer or propylene copolymer) generated during the preparation of the film cannot be recycled for use as a regrind material, and further causes yellowing on the finally produced film Therefore, this method is not economical, and the yellow film produced with the regrind scrap material is commercially unacceptable.

European Patent No. EP0053498B1 discloses a biaxially oriented multilayer polyester film. The polyester film has a transparent base layer (B) and an additional layer (A) having a matte appearance applied to at least one side of the transparent base layer (B). The matte appearance layer (A) consists essentially of a co-polyester having polyethylene terephthalate and a plurality of inert inorganic particles having an average diameter of between 0.3 μm and 20 μm. Based on the total weight of the layer having the matte appearance, the content of the inert inorganic particles is between 3 wt % and 40 wt %. The film has a high degree of matteness (i.e., a gloss value of less than 15) and a transparency of greater than 60%. However, the film still leaves more to be desired in some applications or markets.

SUMMARY OF THE DISCLOSURE

In response to the above-referenced technical inadequacies, the present disclosure provides a biaxially stretched polyester film and a method for producing the same.

In one aspect, the present disclosure provides a biaxially stretched polyester film including a polyester resin base layer and a matte layer formed on a side surface of the polyester resin base layer. The polyester resin base layer includes: a polyester resin base material and a high viscosity polyester resin material. Based on the total weight of the polyester resin base layer, (1) a content of the polyester resin base material is between 50 wt % and 95 wt %, in which an intrinsic viscosity of the polyester resin base material is between 0.5 dL/g and 0.8 dL/g; and (2) a content of the high viscosity polyester resin material is between 0.01 wt % and 5 wt %, in which the high viscosity polyester resin material is dispersed in the polyester resin base material, and an intrinsic viscosity of the high viscosity polyester resin material is between 0.9 dL/g and 1.1 dL/g. The matte layer includes: a polyester resin matrix material and a plurality of filler particles. Based on the total weight of the matte layer, (1) a content of the polyester resin matrix material is between 50 wt % and 95 wt %, in which an intrinsic viscosity of the polyester resin matrix material is between 0.5 dL/g and 0.8 dL/g; and (2) a content of the plurality of filler particles is between 0.3 wt % and 40 wt %, in which the plurality of filler particles are dispersed in the polyester resin matrix material, and the plurality of filler particles have an average particle size of between 0.15 μm and 10 μm.

In another aspect, the present disclosure provides a method for producing a biaxially stretched polyester film. The method includes: feeding a polyester resin base material and a high viscosity polyester resin material into a first extruder; feeding a polyester resin matrix material and a plurality of filler particles into a second extruder; using a co-extrusion method to co-extrude the polyester resin base material and the high viscosity polyester resin material that are disposed in the first extruder, and the polyester resin matrix material and the plurality of filler particles that are disposed in the second extruder, so that the polyester resin base material and the high viscosity polyester resin material are collectively formed into a polyester resin base layer, and the polyester resin matrix material and the plurality of filler particles are collectively formed into a matte layer that is disposed on a side surface of the polyester resin base layer; and biaxially stretching an un-stretched polyester film formed by the polyester resin base layer and the matte layer, so that a biaxially stretched polyester film is formed. Based on the total weight of the polyester resin base layer, a content of the polyester resin base material is between 50 wt % and 95 wt %, and a content of the high viscosity polyester resin material is between 0.01 wt % and 5 wt %. An intrinsic viscosity of the polyester resin base material is between 0.5 dL/g and 0.8 dL/g, and an intrinsic viscosity of the high viscosity polyester resin material is between 0.9 dL/g and 1.1 dL/g. Based on the total weight of the matte layer, a content of the polyester resin matrix material is between 50 wt % and 95 wt %, and a content of the plurality of filler particles is between 0.3 wt % and 40 wt %. An intrinsic viscosity of the polyester resin matrix material is between 0.5 dL/g and 0.8 dL/g, and the plurality of filler particles have an average particle size of between 0.15 μm and 10 μm.

Therefore, the biaxially stretched polyester film of the present disclosure can exhibit a matte effect on its single sided surface through the technical solutions of "a matte layer being formed on a side surface of the polyester resin base layer." and "the polyester resin base layer includes: a polyester resin base material and a high viscosity polyester resin material; based on the total weight of the polyester resin base layer, (1) a content of the polyester resin base material is between 50 wt % and 95 wt %, in which an intrinsic viscosity of the polyester resin base material is between 0.5 dL/g and 0.8 dL/g; and (2) a content of the high viscosity polyester resin material is between 0.01 wt % and 5 wt %, in which the high viscosity polyester resin material is dispersed in the polyester resin base material, and an intrinsic viscosity of the high viscosity polyester resin material is between 0.9 dL/g and 1.1 dL/g." and "the matte layer includes: a polyester resin matrix material and a plurality of filler particles; based on the total weight of the matte layer, (1) a content of the polyester resin matrix material is between 50 wt % and 95 wt %, in which an intrinsic viscosity of the polyester resin matrix material is between 0.5 dL/g and 0.8 dL/g; and (2) a content of the plurality of filler particles is between 0.3 wt % and 40 wt %, in which the plurality of filler particles are dispersed in the polyester resin matrix material, and the plurality of filler particles have an average particle size of between 0.15 μm and 10 μm." Moreover, the matte layer can have good compatibility with the polyester resin base layer, and the entire biaxially stretched polyester film can still maintain good transparency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
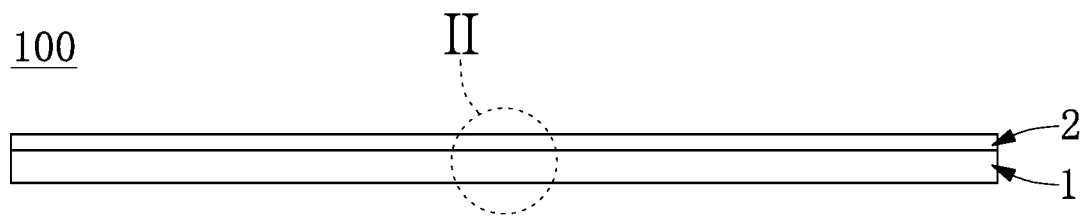
FIG. 1 is a cross-sectional view of a biaxially stretched polyester film according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Biaxially Stretched Polyester Film

Figure 2:
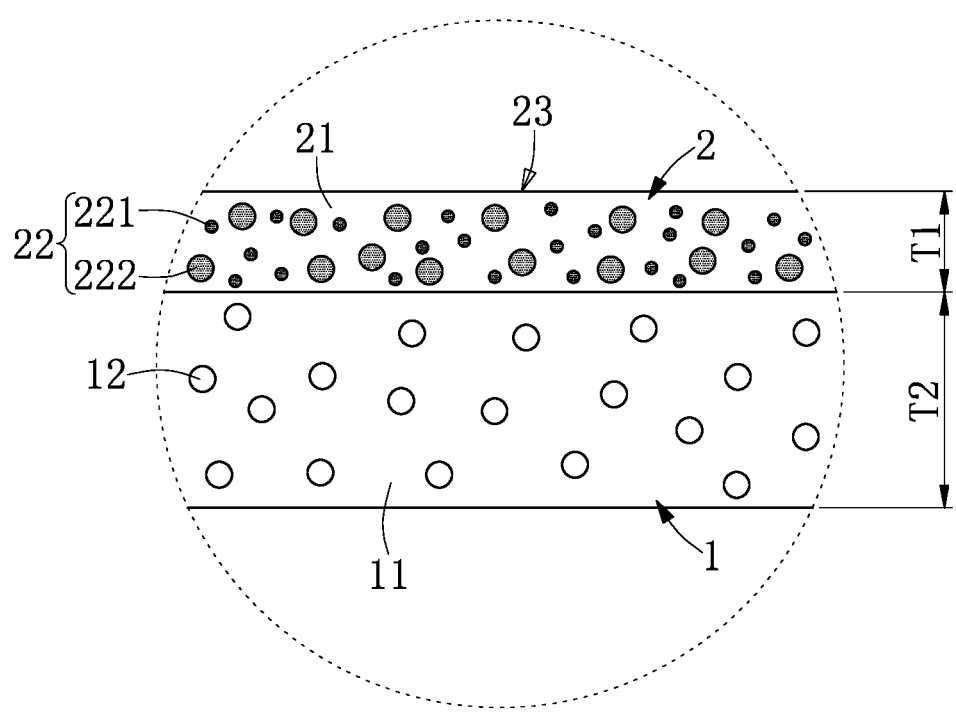
FIG. 2 is a partial enlarged view of a region II of FIG. 1.

Referring to FIG. 1 and FIG. 2, the present embodiment discloses a biaxially stretched polyester film 100 (also called biaxially oriented polyester film, BOPET film) The biaxially stretched polyester film 100 includes a polyester resin base layer 1 and a matte layer 2 formed on a side surface of the polyester resin base layer 1. More specifically, the biaxially stretched polyester film 100 is formed by the polyester resin base layer 1 and the matte layer 2, and the biaxially stretched polyester film 100 is formed through a co-extrusion process and a biaxial-stretching process sequentially.

By the composition selections and the concentration adjustments of the polyester resin base layer 1 and the matte layer 2, the biaxially stretched polyester film 100 can exhibit a matte effect on its single sided surface. That is, one side surface of the biaxially stretched polyester film 100 can exhibit a matte effect, and the entire biaxially stretched polyester film 100 can still maintain good transparency.

In order to achieve the above objectives, in the present embodiment, the polyester resin base layer 1 has a thickness T1 ranging from 1 μm to 100 μm, and preferably ranging from 10 μm to 100 μm.

In addition, the polyester resin base layer 1 includes: a polyester resin base material 11 and a high viscosity polyester resin material 12. The high viscosity polyester resin material 12 is dispersed in the polyester resin base material 11.

In addition, the polyester resin base material 11 is a polymer prepared from a condensation reaction between a dibasic acid and a diol or a derivative thereof. That is, the base material of the polyester resin base layer 1 is mainly a polyester material. Preferably, the polyester material is polyethylene terephthalate (PET) or polyethylene naphthalate (PEN), but the present disclosure is not limited thereto. Accordingly, the polyester resin base layer 1 enables the entire biaxially stretched polyester film 100 to have a good transparency, and the polyester resin base layer 1 can provide good support to the matte layer 2. It should be noted that the polyester resin base layer 1 of the present embodiment preferably does not include any filler particle (i.e., inorganic filler particles).

It is worth mentioning that the above-mentioned raw material dibasic acid that forms the polyester material is at least one selected from the group consisting of terephthalic acid, isophthalic acid, 1,5-naphthalene dicarboxylic acid, 2,6-naphthalene dicarboxylic acid 2,6-naphthalene dicarboxylic acid, 1,4-naphthalene dicarboxylic acid, dibenzoic acid, diphenylethane dicarboxylic acid, diphenylphosphonium dicarboxylic acid, indole-2,6-dicarboxylic acid, 1,3-cyclopentanedicarboxylic acid, 1,3-cyclohexanedicarboxylic acid, 1,4-cyclohexanedicarboxylic acid, malonic acid, dimethylmalonic acid, succinic acid, diethyl 3,3-succinate, glutaric acid, 2,2-dimethylglutaric acid, adipic acid, 2-methyladipate, trimethyl adipate, pimelic acid, azelaic acid, azelaic acid, suberic acid, and dodecanedioic acid.

The above-mentioned raw material diol that forms the polyester material is at least one selected from the group consisting of ethylene glycol, propylene glycol, hexamethylene glycol, neopentyl glycol, 1,2-cyclohexanedimethanol, 1,4-cyclohexanedimethanol, 1,10-decanediol, 1,3-propanediol, 1,4-butanediol, 1,5-pentanediol, 1,6-hexanediol, and 2,2-bis(4-hydroxyphenyl)propane, and bis(4-hydroxyphenyl)anthracene.

It is worth mentioning that in terms of the thickness of the base layer, if the thickness T1 of the polyester resin base layer 1 is greater than the upper limit of the above thickness range, the transparency of the biaxially stretched polyester film 100 will be deteriorated. Conversely, if the thickness T1 of the polyester resin base layer 1 is less than the lower limit of the above thickness range, the polyester resin base layer 1 cannot provide good support to the matte layer 2.

In terms of the content of each components, based on the total weight of the polyester resin base layer 1 being 100 wt %, a content of the polyester resin base material 11 is between 50 wt % and 95 wt %, and a content of the high viscosity polyester resin material 12 is between 0.01 wt % and 5 wt %.

In terms of the physicochemical property of each component, an intrinsic viscosity (abbreviated as IV) of the polyester resin base material 11 is between 0.5 dL/g and 0.8 dL/g. That is, the polyester resin base material 11 is a polyester resin that has an intermediate viscosity. Different from the polyester resin base material 11, an intrinsic viscosity of the high viscosity polyester resin material 12 is between 0.9 dL/g and 1.1 dL/g.

According to the selections of the contents and intrinsic viscosities of the polyester resin base material 11 and the high viscosity polyester resin material 12, the viscosity difference between the polyester resin base layer 1 and the matte layer 2 can be reduced, thereby reducing the residual stress of the polyester resin base layer 1 and the matte layer 2 when co-extruded, and further improving the compatibility between the polyester resin base layer 1 and the matte layer 2. Furthermore, the overall transparency of the biaxially stretched polyester film 100 can be maintained above a certain level.

However, if the content of the high viscosity polyester resin material 12 is greater than the upper limit of the above content range (i.e., greater than 5 wt %), the haze value of the polyester resin base layer 1 will become too high, and the high viscosity polyester resin material 12 cannot be uniformly dispersed in the polyester resin base material 11, so that the film formation of the polyester resin base layer 1 may have defects, and the transparency of the entire biaxially stretched polyester film 100 will be deteriorated. Conversely, if the content of the high viscosity polyester resin material 12 is less than the lower limit of the above content range (i.e., less than 0.01 wt %), the entire biaxially stretched polyester film 100 will not achieve the desired physical and chemical properties (such as haze value).

It is worth mentioning that in the polyester resin base layer 1, the high viscosity polyester resin material 12 is also a polymer prepared by a condensation reaction between a dibasic acid and a diol or a derivative thereof. That is, the high viscosity polyester resin material 12 is also a polyester material.

In order to achieve the above objectives, in the present embodiment, the matte layer 2 has a thickness T2 ranging from 1 μm to 100 μm, and preferably ranging from 5 μm to 85 μm.

If the thickness T2 of the matte layer 2 is greater than the upper limit of the above thickness range, the transparency of the biaxially stretched polyester film 100 will be deteriorated. Conversely, if the thickness T2 of the matte layer 2 is less than the lower limit of the above thickness range, the haze value of the matte layer 2 will become insufficient, so that the matte layer 2 cannot achieve the desired physicochemical properties.

Further, the matte layer 2 includes a polyester resin matrix material 21 and a plurality of filler particles 22. The plurality of filler particles 22 are uniformly dispersed in the polyester resin matrix material 21.

In terms of the content of each component, based on the total weight of the matte layer 2 that is 100 wt %, a content of the polyester resin matrix material 21 is between 50 wt % and 95 wt %. In addition, a content of the plurality of filler particles 22 is between 0.3 wt % and 40 wt %, and preferably between 0.3 wt % and 25 wt %.

In terms of the physicochemical property of each component, an intrinsic viscosity of the polyester resin matrix material 21 is between 0.5 dL/g and 0.8 dL/g. That is, the polyester resin matrix material 21 is a polyester resin that has an intermediate viscosity.

It is worth mentioning that in the matte layer 2, the polyester resin matrix material 21 is also a polymer prepared by a condensation reaction between a dibasic acid and a diol or a derivative thereof. That is, the polyester resin matrix material 21 is also a polyester material.

Since in the biaxially stretched polyester film 100 of the present embodiment, the main materials respectively used in the polyester resin base layer 1 and the matte layer 2 are both polyester materials, the biaxially stretched polyester film 100 can have good productivity and processability. In addition, the scrap material generated from the biaxially stretched polyester film 100 during the production process can also be recycled into the production process as a recycled material, and the film produced from the recycled material does not have issues such as yellowing.

Further, in the present embodiment, an average particle size of the plurality of filler particles 22 is between 0.15 μm and 10 μm. Based on the total weight of the matte layer 2 that is 100 wt %, a content of the plurality of filler particles 22 is between 0.3 wt % and 40 wt %.

Accordingly, when a light ray passes through the matte layer 2, the light ray can be scattered by the matte layer 2 due to the introduction of the plurality of filler particles 22. The biaxially stretched polyester film 100 can exhibit a matte effect on its single sided surface, while the entire biaxially stretched polyester film 100 can still maintain good transparency.

In other words, by introducing the plurality of filler particles 22 into the matte layer 2 and by the parameter selections of each component that includes content range and physicochemical property, the biaxially stretched polyester film 100 can exhibit a matte effect on its single sided surface, while the entire biaxially stretched polyester film 100 can still maintain good transparency.

In terms of content, if the content of the plurality of filler particles 22 is greater than the upper limit of the above content range (i.e., greater than 40 wt %), the haze value of the matte layer 2 will become too high, the plurality of filler particles 22 cannot be uniformly dispersed in the polyester resin matrix material 21, and the plurality of filler particles 22 may aggregate with each other. Therefore, the overall transparency of the biaxially stretched polyester film 100 may be deteriorated. Conversely, if the content of the plurality of filler particles 22 is less than the lower limit of the above content range (i.e., less than 0.3 wt %), the haze value of the matte layer 2 will become insufficient.

In terms of average particle size, if the average particle size of the plurality of filler particles 22 is greater than the upper limit of the above average particle size range, the overall transparency of the biaxially stretched polyester film 100 will be deteriorated. Conversely, if the average particle size of the plurality of filler particles 22 is less than the lower limit of the above average particle size range, the surface roughness of the matte layer 2 will become too low.

Further, in an embodiment of the present disclosure, the plurality of filler particles 22 can be further divided into a plurality of first filler particles 221 and a plurality of second filler particles 222 in accordance with the difference in average particle size. The plurality of first filler particles 221 and the plurality of second filler particles 222 are mixed with each other, the plurality of first filler particles 221 have a first average particle size, and the plurality of second filler particles 222 has a second average particle size.

The first average particle size of the plurality of first filler particles 221 is between 0.15 μm and 2 μm, and the second average particle size of the plurality of second filler particles 222 is between 2 μm and 10 μm. In addition, an absolute value of a difference between the first average particle size of the plurality of first filler particles 221 and the second average particle size of the plurality of second filler particles 222 is not less than 1 μm, and preferably not less than 3 μm.

In an embodiment of the present disclosure, the plurality of first filler particles 221 and second filler particles 222 are spherical or irregularly shaped silicon dioxide particles, but the present disclosure is not limited thereto. For example, the materials of the first filler particles 221 and second filler particles 222 may be respectively selected from the group consisting of silicon dioxide, titanium dioxide, cerium dioxide, aluminum hydroxide, magnesium hydroxide, aluminum oxide, magnesium oxide, boron oxide, calcium oxide, calcium carbonate, barium carbonate, strontium titanate, barium titanate, calcium titanate, magnesium titanate, calcium sulfate, barium sulfate, lithium phosphate, calcium phosphate, magnesium phosphate, boron nitride, aluminum nitride, carbon black, talc, kaolinite, and crosslinked polymer.

It is also worth mentioning that in an embodiment of the present disclosure, the plurality of first filler particles 221 and the plurality of second filler particles 222 are mixed with each other based on a weight ratio ranging between 1:9 and 9:1, so that a particle size distribution curve obtained by a dynamic light scattering method (DLS) of a mixture mixed by the plurality of first filler particles 221 and the plurality of second filler particles 222 exhibits a single-peak distribution. Accordingly, the uniformity of the surface roughness of the matte layer 2 can be effectively improved, and the biaxially stretched polyester film 100 can have a low gloss matte surface and achieve a high transparency effect.

According to the above configuration, a side surface 23 of the matte layer 2 away from the polyester resin base layer 1 (i.e., the outer surface 23 of the matte layer 2) has an average roughness (Ra) of between 150 nm and 950 nm. The entire biaxially stretched polyester film 100 of the present embodiment has a transparency (at the visible wavelength range) of not less than 80%, a gloss value of not more than 60% (preferably between 30% and 55%), and a haze value of not less than 4% (preferably between 50% and 80%).

Based on the above physicochemical properties, the biaxially stretched polyester film 100 of the present embodiment is particularly suitable for use as a release film, a barrier film, or a special packaging material.

In an embodiment of the present disclosure, when the biaxially stretched polyester film 100 is used as the release film, the matte layer 2 of the biaxially stretched polyester film 100 may be coated with a release agent. In other words, the biaxially stretched polyester film 100 may serve as a substrate for coating various types of resins, such as thermoplastic polyurethane (TPU) and chlorinated polypropylene resin (CPP).

In an embodiment of the present disclosure, when the biaxially stretched polyester film 100 is used as the barrier film, the matte layer 2 of the biaxially stretched polyester film 100 can be vapor-deposited with an inorganic material to improve the effect of blocking moisture and gas.

In an embodiment of the present disclosure, since the biaxially stretched polyester film 100 has a single-sided matte and high transparency property, the biaxially stretched polyester film 100 is also particularly suitable for use as a special package material.

In an embodiment of the present disclosure, the material composition of the polyester resin base layer 1 does not include any filler particle, and the material composition of the matte layer 2 does not include any high viscosity polyester resin material. That is to say, the present disclosure has excluded the possibility that the material composition of the polyester resin base layer 1 includes filler particles, and has excluded the possibility that the material composition of the matte layer 2 includes a high viscosity polyester resin material.

Method for Producing Polyester Film

The related description of the biaxially stretched polyester film 100 is described above, and a method for producing the biaxially stretched polyester film 100 will be described below according to an embodiment of the present disclosure.

Figure 3:
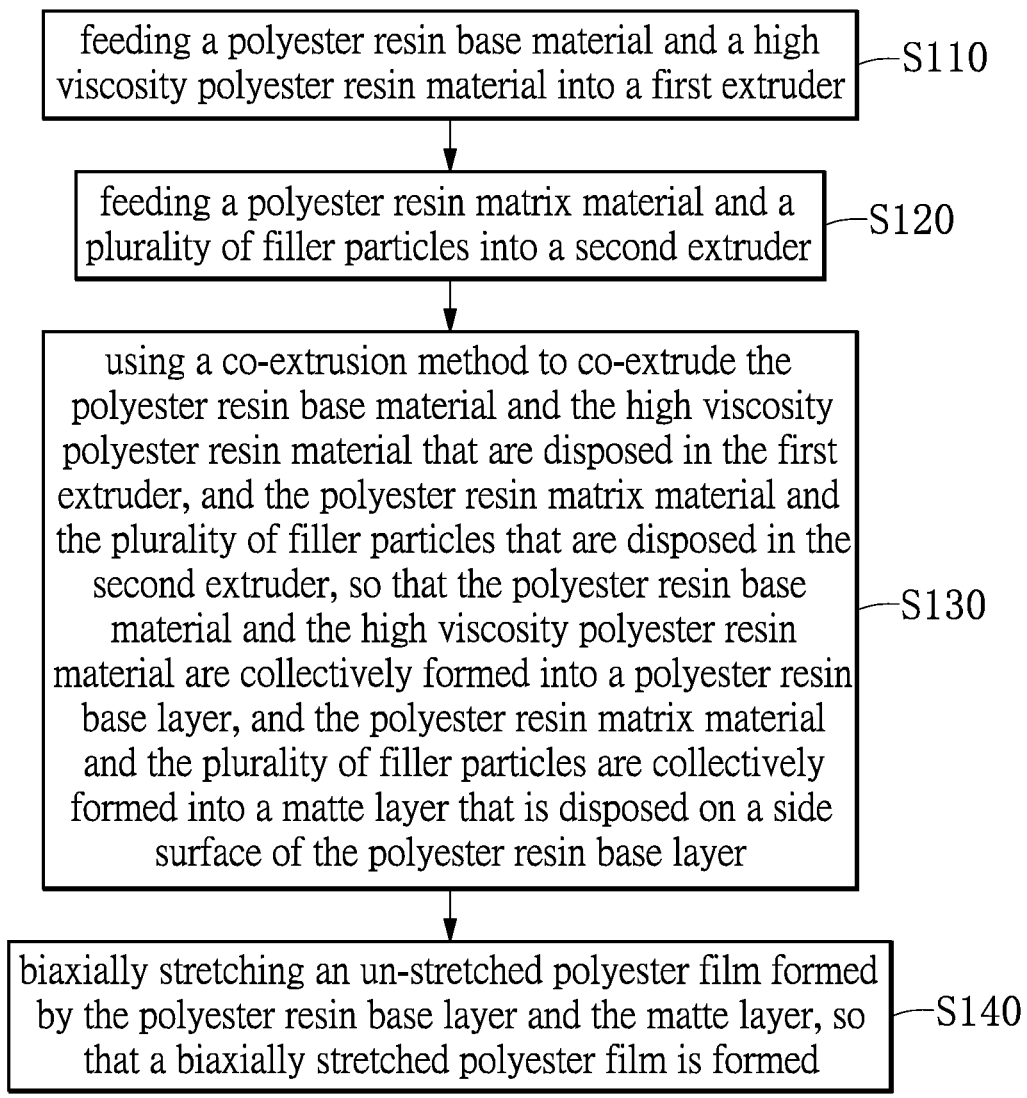
FIG. 3 is a flow chart of a method for producing the biaxially stretched polyester film according to the embodiment of the present disclosure.
Figure 4:
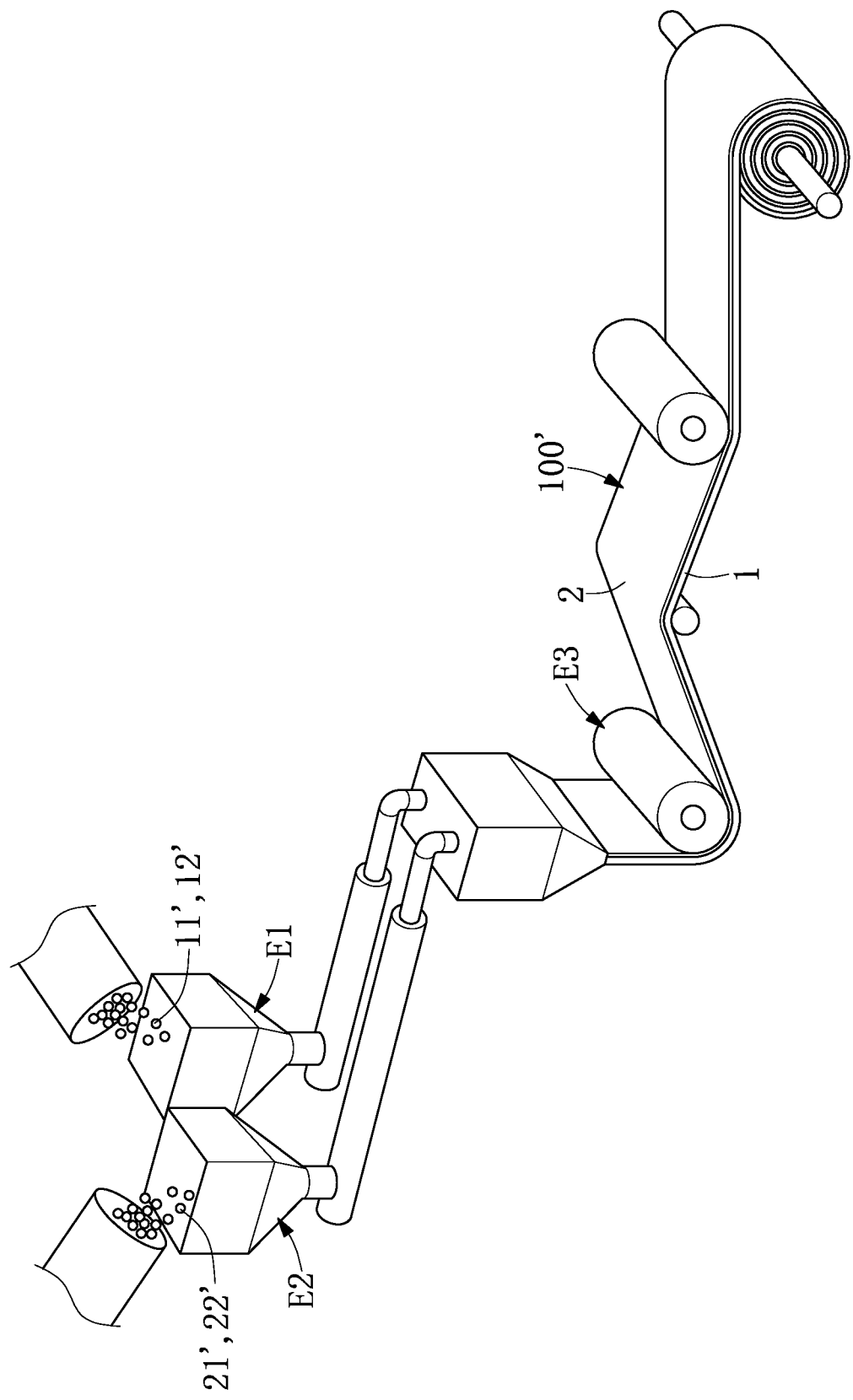
FIG. 4 is a schematic view of a co-extrusion extruder according to the embodiment of the present disclosure.

Referring to FIG. 3 and FIG. 4, the present embodiment discloses a method for producing a biaxially stretched polyester film 100. The method for producing the biaxially stretched polyester film 100 includes step S110, step S120, step S130, and step S140. It should be noted that the order of the steps described in the present embodiment and the actual way of operation may be adjusted according to practical requirements, and the present disclosure is not limited thereto.

The step S110 includes feeding a polyester resin base material 11' and a high viscosity polyester resin material 12' into a first extruder E1, and then melting the polyester resin base material 11' and the high viscosity polyester resin material 12' at a high temperature of between 260° C. and 300° C. Moreover, an intrinsic viscosity of the polyester resin base material 11' is between 0.5 dL/g and 0.8 dL/g. That is, the polyester resin base material 11' is a polyester resin having an intermediate viscosity. Further, an intrinsic viscosity of the high viscosity polyester resin material 12' is between 0.9 dL/g and 1.1 dL/g.

The step 120 includes feeding a polyester resin matrix material 21' and a plurality of filler particles 22' into a second extruder E2, and then melting and mixing the polyester resin matrix material 21' and the plurality of filler particles 22' at a high temperature of between 260° C. and 300° C. Moreover, an intrinsic viscosity of the polyester resin matrix material 21' is between 0.5 dL/g and 0.8 dL/g. That is, the polyester resin matrix material 21' is also a polyester resin having an intermediate viscosity. In addition, the plurality of filler particles 22' have an average particle size of between 0.15 μm and 10 μm.

The step 130 includes using a co-extrusion method to co-extrude the polyester resin base material 11' and the high viscosity polyester resin material 12' that are disposed in the first extruder E1, and the polyester resin matrix material 21' and the plurality of filler particles 22' that are disposed in the second extruder E2, and then rapid cooling the extruded materials via a cooled drum E3 (i.e., a drum cooled to 20° C. to 50° C.), so that the polyester resin base material 11' and the high viscosity polyester resin material 12' are collectively formed into a polyester resin base layer 1, and the polyester resin matrix material 21' and the plurality of filler particles 22' are collectively formed into a matte layer 2 that is disposed on a side surface of the polyester resin base layer 1. Accordingly, the polyester resin base layer 1 and the matte layer 2 together form an un-stretched polyester film 100'.

The step 140 includes biaxially stretching the un-stretched polyester film 100' formed by the polyester resin base layer 1 and the matte layer 2, so that the un-stretched polyester film 100' is formed into a biaxially stretched polyester film 100 having a double-layer structure.

Further, the biaxial stretching method may be, for example, a longitudinal uniaxial stretching method, a transverse uniaxial stretching method, a vertical axis-horizontal axis sequential biaxial stretching method, or a vertical axis-horizon axis simultaneous biaxial stretching method, and the present disclosure is not limited thereto. In addition, the above biaxial stretching method may, for example, preheat the un-stretched polyester film 100' at an extension temperature of between 50° C. and 150° C. The biaxial stretching method further includes applying a stretching process of 2.0 times to 5.0 times, and preferably 3.0 times to 4.0 times, in a width direction (or lateral direction, TD) of the un-stretched polyester film 100' according to different elongation ratios; and then applying a stretching process of 1.0 times to 3.0 times, and preferably 1.0 times to 2.5 times, in a length direction (or longitudinal direction, MD) of the un-stretched polyester film 100'.

Based on the total weight of the polyester resin base layer 1, a content of the polyester resin base material 11' is between 50 wt % and 95 wt %, and a content of the high viscosity polyester resin material 12' is between 0.01 wt % and 5 wt %. In addition, based on the total weight of the matte layer 2, a content of the polyester resin matrix material 21' is between 50 wt % and 95 wt %, and a content of the plurality of filler particles 22' is between 0.3 wt % and 40 wt %.

According to the above method for producing the biaxially stretched polyester film 100, a side surface 23 of the matte layer 2 away from the polyester resin base layer 1 has an average roughness (Ra) of between 150 nm and 950 nm, and the entire biaxially stretched polyester film 100 has a transparency of not less than 80%, a gloss value of not more than 60% (preferably between 20% and 40%), and a haze value of not less than 4%.

Experimental Results

Hereinafter, exemplary examples 1 to 4 and comparative examples 1 to 2 will now be described in detail. However, the exemplary examples are only used to help in the understanding of the present disclosure, and the scope of the present disclosure is not limited to these examples.

The biaxially stretched polyester films of the exemplary examples 1 to 4 and the comparative examples 1 to 2 can be produced by referring to the above steps S110 to S140. Among them, the content of each component and the process parameters are shown in Table 1 below.

Further, the biaxially stretched polyester films of the exemplary examples 1 to 4 and the comparative examples 1 to 2 were subjected to different tests to obtain different physicochemical properties, such as the surface roughness of the polyester film, and the transparency, gloss value, and haze value of the entire polyester film. The relevant test methods are described below, and the relevant test results are shown in Table 1 below.

The roughness test includes: using a three-dimensional surface roughness meter (Otaru Research Institute, trade name SURF CORDER SE-3CK) to test the center line average roughness (Ra) and the ten-point average roughness (Rz) of the surfaces of the biaxially stretched polyester films of the exemplary examples 1 to 4 and the comparative examples 1 to 2 according to JIS B0601 and JIS B0651 under the conditions of stylus tip R2ym, scanning pitch 2μπι, scanning length 1 mm, scanning strips 100, cut-off value 0.25 mm and magnification of 5,000 times. The roughness listed in Table 1 is the center line average roughness (Ra).

The transparency/haze test includes: using a haze meter (TC-HIII produced by Tokyo Denshoku Co., Ltd.) to test the transparency (light transmittance rate) and the haze value of the biaxially stretched polyester films of the exemplary examples 1 to 4 and the comparative examples 1 to 2 according to JIS K7705.

The gloss test includes: using a gloss meter (VGS-SENSOR produced by Nippon Denshoku Industries Co., Ltd.) to test the gloss value (G60) of the biaxially stretched polyester films of the exemplary examples 1 to 4 and the comparative examples 1 to 2 according to JIS Z 8741. The test conditions were as follows: the incident angle and the acceptance angle were both 60° (N=5), and the average value was used.

Table 1 shows the material parameters and test results of the exemplary and comparative examples.

| | terms | exemplary example 1 | exemplary example 2 | exemplary example 3 | exemplary example 4 |
|---|---|---|---|---|---|
| matte layer | thickness of matte layer (μm) | 10 | 80 | 20 | 80 |
| | content of polyester resin matrix material (wt %) | 98.2 | 98.8 | 80.0 | 98.8 |

-continued

| | terms | | | | |
|---|---|---|---|---|---|
| | intrinsic viscosity of polyester resin matrix material (dL/g) | 0.6 | 0.6 | 0.8 | 0.6 |
| | total content of filler particles (wt %) | 1.8 | 1.2 | 20.0 | 1.2 |
| | content of first filler particles (wt %) | 1.6 | 1.0 | 2.0 | 1.0 |
| | average particle size of first filler particles (μm) | 2.5 | 6.0 | 5.0 | 6.0 |
| | content of second filler particles (wt %) | 0.2 | 0.2 | 18.0 | 0.2 |
| | average particle size of second filler particles (μm) | 1.4 | 1.4 | 2.0 | 1.4 |
| polyester resin base layer | thickness of polyester resin base layer (μm) | 12 | 100 | 80 | 20 |
| | content of polyester resin base material (wt %) | 99.8 | 99.8 | 99.8 | 99.5 |
| | intrinsic viscosity of polyester resin base material (dL/g) | 0.6 | 0.6 | 0.8 | 0.6 |
| | content of high viscosity polyester resin material (wt %) | 0.01 | 0.01 | 0.01 | 0.50 |
| | intrinsic viscosity of high viscosity polyester resin material (dL/g) | 0.9 | 0.9 | 1.1 | 1.1 |
| | content of filler particles (wt %) | — | — | — | — |
| | average particle size of filler particles (μm) | — | — | — | — |
| test results | surface roughness (Ra) of matte surface (nm) | 226 | 520 | 803 | 652 |
| | surface roughness (Ra) of flat surface (nm) | 171 | 321 | 262 | 267 |
| | ratio of Ra values of matte surface to flat surface | 1.32 | 1.62 | 3.06 | 2.44 |
| | transparency of entire polyester film (%) | 85.1 | 82.9 | 83.2 | 86.5 |
| | gloss value of matte surface (%) | 37 | 52 | 55 | 59 |
| | gloss value of flat surface (%) | 66 | 64 | 71 | 68 |
| | ratio of gloss values of matte surface to flat surface | 0.56 | 0.81 | 0.77 | 0.86 |
| | haze value of entire polyester film (%) | 60.01 | 73.80 | 72.82 | 75.21 |

| | terms | comparative example 1 | comparative example 2 |
|---|---|---|---|
| matte layer | thickness of matte layer (μm) | — | — |
| | content of polyester resin matrix material (wt %) | — | — |
| | intrinsic viscosity of polyester resin matrix material (dL/g) | — | — |
| | total content of filler particles (wt %) | — | — |
| | content of first filler particles (wt %) | — | — |
| | average particle size of first filler particles (μm) | — | — |
| | content of second filler particles (wt %) | — | — |
| | average particle size of second filler particles (μm) | — | — |
| resin base | thickness of polyester resin base layer (μm) | 12 | 100 |
| | content of polyester resin base material (wt %) | 100 | 100 |
| | intrinsic viscosity of polyester resin base material (dL/g) | 0.6 | 0.6 |
| | content of high viscosity polyester resin material (wt %) | — | — |
| | intrinsic viscosity of high viscosity polyester resin material (dL/g) | — | — |
| | content of filler particles (wt %) | 0.3 | 0.2 |

-continued

| | | | |
|---|---|---|---|
| | average particle size of filler particles (μm) | 1.4 | 1.4 |
| test results | surface roughness (Ra) of matte surface (nm) | 18 | 24 |
| | surface roughness (Ra) of flat surface (nm) | 18 | 24 |
| | ratio of Ra values of matte surface to flat surface | 1 | 1 |
| | transparency of entire polyester film (%) | 89.0 | 88.4 |
| | gloss value of matte surface (%) | 165 | 167 |
| | gloss value of flat surface (%) | 165 | 167 |
| | ratio of gloss values of matte surface to flat surface | 1 | 1 |
| | haze value of entire polyester film (%) | 3.62 | 4.62 |

Discussion of Test Results

According to the material and process parameters of the exemplary and comparative examples as shown in Table 1, the polyester films having one-sided matte surface of the exemplary examples 1 to 4 all have a transparency of not less than 80% and a matte surface gloss value of not more than 60%. Further, when the thickness of the matte layer is relatively thick, the matte layer can have a lower filler particle content, which still achieves the same effect. For example, the thickness of the matte layer of the exemplary example 3 is 20 μm, and the total content of the filler particles is 20 wt %. Comparatively, the thickness of the matte layer of the exemplary example 4 is 80 μm, and the total content of the filler particles is 1.2 wt % (i.e., a lower filler particle content).

Further, in the polyester films of the exemplary examples 1 to 4, a ratio of the surface roughness of the matte surface to the surface roughness of the flat surface is not less than 1.3 and is substantially between 1.3 and 3.5; and a ratio of the gloss value of the matte surface to the gloss value of the flat surface is not more than 0.9 and is substantially between 0.5 and 0.9. It should be noted that the above "matte surface" refers to the outer surface of the matte layer, and the above "flat surface" refers to the outer surface of the polyester resin base layer.

The polyester films of the comparative examples 1 to 2 do not have any matte layer. The filler particles are added to the polyester resin base layer of the polyester films, but the content of the filler particles is less than 0.3 wt %. Although the transparency of the polyester films of the comparative examples is more than 80%, the gloss value and the haze value are both low; therefore, the comparative examples cannot achieve the matte effect of the exemplary examples.

Advantageous Effect

In conclusion, the biaxially stretched polyester film 100 of the present disclosure can exhibit a matte effect on its single sided surface through the technical solutions of "a matte layer 2 being formed on a side surface of the polyester resin base layer 1." and "the polyester resin base layer 1 includes: a polyester resin base material 11 and a high viscosity polyester resin material 12; based on the total weight of the polyester resin base layer 1, (1) a content of the polyester resin base material 11 is between 50 wt % and 95 wt %, in which an intrinsic viscosity of the polyester resin base material 11 is between 0.5 dL/g and 0.8 dL/g; and (2) a content of the high viscosity polyester resin material 12 is between 0.01 wt % and 5 wt %, in which the high viscosity polyester resin material 12 is dispersed in the polyester resin base material 11, and an intrinsic viscosity of the high viscosity polyester resin material 12 is between 0.9 dL/g and 1.1 dL/g." and "the matte layer 2 includes: a polyester resin matrix material 21 and a plurality of filler particles 22; based on the total weight of the matte layer 2, (1) a content of the polyester resin matrix material 21 is between 50 wt % and 95 wt %, in which an intrinsic viscosity of the polyester resin matrix material 21 is between 0.5 dL/g and 0.8 dL/g; and (2) a content of the plurality of filler particles 22 is between 0.3 wt % and 40 wt %, in which the plurality of filler particles 22 are dispersed in the polyester resin matrix material 21, and the plurality of filler particles 22 have an average particle size of between 0.15 μm and 10 μm." Moreover, the matte layer 2 can have good compatibility with the polyester resin base layer 1, and the entire biaxially stretched polyester film 100 can still maintain good transparency.

According to the selections of the contents and intrinsic viscosities of the polyester resin base material 11 and the high viscosity polyester resin material 12, the viscosity difference between the polyester resin base layer 1 and the matte layer 2 can be reduced, thereby reducing the residual stress of the polyester resin base layer 1 and the matte layer 2 when co-extruded, and further improving the compatibility between the polyester resin base layer 1 and the matte layer 2. Furthermore, the overall transparency of the biaxially stretched polyester film 100 can also be maintained above a certain level.

Further, since in the biaxially stretched polyester film 100 of the present embodiment, the matrix materials respectively used in the polyester resin base layer 1 and the matte layer 2 are both polyester materials, the biaxially stretched polyester film 100 can have good productivity and processability. In addition, the scrap material generated from the biaxially stretched polyester film 100 during the production process can also be recycled into the production process as a recycled material, and the film produced from the recycled material does not have issues such as yellowing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A biaxially stretched polyester film, comprising:
a polyester resin base layer; wherein a thickness of the polyester resin base layer is between 12 μm and 100 μm, the polyester resin base layer includes: a polyester resin base material and a polyester resin filler, and based on the total weight of the polyester resin base layer being 100% wt,
(1) a content of the polyester resin base material is between 99.5 wt % and 99.8 wt %, wherein an intrinsic viscosity of the polyester resin base material is between 0.5 dL/g 0.6 dL/g and 0.8 dL/g; and
(2) a content of the polyester resin filler is between 0.01 wt % and 0.5 wt %, wherein the polyester resin filler is dispersed in the polyester resin base material, and an intrinsic viscosity of the polyester resin filler is between 0.9 dL/g and 1.1 dL/g; and
a matte layer being formed on a side surface of the polyester resin base layer; wherein a thickness of the matte layer is between 10 μm and 80 μm, the matte layer includes: a polyester resin matrix material and a plurality of filler particles, and based on the total weight of the matte layer,
(1) a content of the polyester resin matrix material is between 80 wt % and 98.8 wt %, wherein an intrinsic viscosity of the polyester resin matrix material is between 0.6 dL/g and 0.8 dL/g; and
(2) a total content of the plurality of filler particles is between 1.2 wt % and 20 wt %, wherein the plurality of filler particles are dispersed in the polyester resin matrix material, and the plurality of filler particles have an average particle size of between 0.15 μm and 10 μm;
wherein the plurality of filler particles are further divided into: a plurality of first filler particles and a plurality of second filler particles; wherein a content of the first filler particles is between 1 wt % and 2 wt %, a first average particle size of the first filler particles is between 2.5 μm and 6 μm, a content of the second filler particles is between 0.2 wt % and 18 wt %, and a second average particle size of the second filler particles is between 1.4 μm and 2 μm;
wherein the polyester resin base layer does not include any filler particle, and the matte layer does not include any polyester resin filler;
wherein an outer surface of the matte layer is defined as a matte surface, and an outer surface of the polyester resin base layer is defined as a flat surface; wherein a surface roughness (Ra) of the matte surface is between 226 nm and 803 nm, a surface roughness (Ra) of the flat surface is between 171 nm and 321 nm, and a ratio of the surface roughness of the matte surface relative to that of the flat surface is between 1.32 and 3.06;
wherein a gloss value of the matte surface is between 37% and 59%, a gloss value of the flat surface is between 64% and 71%, and a ratio of the gloss value of the matte surface relative to that of the flat surface is between 0.56 and 0.86; wherein the gloss values of the matte surface and the flat surface, and the ratio of the gloss values are with respect to G60 values as measured in accordance with JIS Z 8741;
wherein an entire transparency of the polyester film is between 82.9% and 86.5%, and an entire haze value of the polyester film is between 60.01% and 75.21%.

2. The biaxially stretched polyester film according to claim 1, wherein the polyester resin base material, the polyester resin matrix material, and the polyester resin filler are all polymers prepared by a condensation reaction between a dibasic acid and a diol; wherein each of the first filler particles is made of at least one material selected from a group consisting of silicon dioxide, titanium dioxide, cerium dioxide, aluminum hydroxide, magnesium hydroxide, aluminum oxide, magnesium oxide, boron oxide, calcium oxide, calcium carbonate, barium carbonate, strontium titanate, barium titanate, calcium titanate, magnesium titanate, calcium sulfate, barium sulfate, lithium phosphate, calcium phosphate, magnesium phosphate, boron nitride, aluminum nitride, carbon black, talc, kaolinite, and crosslinked polymer; wherein each of the second filler particles is made of at least one material selected from a group consisting of silicon dioxide, titanium dioxide, cerium dioxide, aluminum hydroxide, magnesium hydroxide, aluminum oxide, magnesium oxide, boron oxide, calcium oxide, calcium carbonate, barium carbonate, strontium titanate, barium titanate, calcium titanate, magnesium titanate, calcium sulfate, barium sulfate, lithium phosphate, calcium phosphate, magnesium phosphate, boron nitride, aluminum nitride, carbon black, talc, kaolinite, and crosslinked polymer.

3. A method for producing a biaxially stretched polyester film, comprising:
feeding a polyester resin base material and a polyester resin filler into a first extruder;
feeding a polyester resin matrix material and a plurality of filler particles into a second extruder;
using a co-extrusion method to co-extrude the polyester resin base material and the polyester resin filler that are disposed in the first extruder, and the polyester resin matrix material and the plurality of filler particles that are disposed in the second extruder, so that the polyester resin base material and the polyester resin filler are collectively formed into a polyester resin base layer, and the polyester resin matrix material and the plurality of filler particles are collectively formed into a matte layer that is disposed on a side surface of the polyester resin base layer; wherein a thickness of the polyester resin base layer is between 12 μm and 100 μm, and a thickness of the matte layer is between 10 μm and 80 μm; and
biaxially stretching an un-stretched polyester film formed by the polyester resin base layer and the matte layer, so that a biaxially stretched polyester film is formed;
wherein based on the total weight of the polyester resin base layer, a content of the polyester resin base material is between 99.5 wt % and 99.8 wt %, and a content of the polyester resin filler is between 0.01 wt % and 0.5 wt %; wherein an intrinsic viscosity of the polyester resin base material is between 0.6 dL/g and 0.8 dL/g, and an intrinsic viscosity of the high viscosity polyester resin material polyester resin filler is between 0.9 dL/g and 1.1 dL/g;
wherein based on the total weight of the matte layer, a content of the polyester resin matrix material is between 80 wt % and 98.8 wt %, and a total content of the plurality of filler particles is between 1.2 wt % and 20 wt %; wherein an intrinsic viscosity of the polyester resin matrix material is between 0.6 dL/g and 0.8 dL/g, and the plurality of filler particles have an average particle size of between 0.15 μm and 10 μm;

wherein the plurality of filler particles are further divided into: a plurality of first filler particles and a plurality of second filler particles; wherein a content of the first filler particles is between 1 wt % and 2 wt %, a first average particle size of the first filler particles is between 2.5 μm and 6 μm, a content of the second filler particles is between 0.2 wt % and 18 wt %, and a second average particle size of the second filler particles is between 1.4 μm and 2 μm;

wherein the polyester resin base layer does not include any filler particle, and the matte layer does not include any polyester resin filler;

wherein an outer surface of the matte layer is defined as a matte surface, and an outer surface of the polyester resin base layer is defined as a flat surface; wherein a surface roughness (Ra) of the matte surface is between 226 nm and 803 nm, a surface roughness (Ra) of the flat surface is between 171 nm and 321 nm, and a ratio of the surface roughness of the matte surface relative to that of the flat surface is between 1.32 and 3.06;

wherein a gloss value of the matte surface is between 37% and 59%, a gloss value of the flat surface is between 64% and 71%, and a ratio of the gloss value of the matte surface relative to that of the flat surface is between 0.56 and 0.86; wherein the gloss values of the matte surface and the flat surface, and the ratio of the gloss values are with respect to G60 values as measured in accordance with JIS Z 8741;

wherein an entire transparency of the polyester film is between 82.9% and 86.5%, and an entire haze value of the polyester film is between 60.01% and 75.21%.

* * * * *